United States Patent [19]
Olsen

[11] Patent Number: 5,287,999
[45] Date of Patent: Feb. 22, 1994

[54] DROP SPREADER

[76] Inventor: Harvey P. Olsen, 409 E. Hudson, Royal Oak, Mich. 48067

[21] Appl. No.: 911,528

[22] Filed: Jul. 10, 1992

[51] Int. Cl.⁵ ............................................ A01C 15/04
[52] U.S. Cl. ..................... 222/616; 222/410
[58] Field of Search .................. 222/410, 613–625

[56] References Cited

U.S. PATENT DOCUMENTS

| | | |
|---|---|---|
| 1,256,854 | 2/1918 | Wickliffe . |
| 2,627,364 | 4/1953 | Schafler et al. . |
| 2,738,901 | 3/1956 | Swenson ............................. 222/616 |
| 2,940,640 | 6/1960 | Erickson . |
| 3,072,290 | 1/1963 | De Biasi . |
| 3,096,004 | 7/1961 | Gandrud . |
| 4,136,804 | 1/1979 | Kinzler et al. . |
| 4,492,321 | 1/1985 | Zoltner . |

Primary Examiner—Jesus D. Sotelo
Attorney, Agent, or Firm—Harness, Dickey & Pierce

[57] ABSTRACT

An apparatus for spreading granular material having a pre-calibrated material gauge removably located in the bottom of a hopper. The granular material is forcibly pressed through discharge apertures formed in the material gauge under the rotatory action of an auger mounted in the hopper. The discharge apertures are sized to inhibit the free flow of granular material therethrough when the auger is not rotating. A clutch mechanism is provided for permitting selective control of the rotary movement of the auger. Since the material gauge is interchangeable, the apparatus can be quickly converted for spreading a variety of differently sized granular materials.

12 Claims, 2 Drawing Sheets

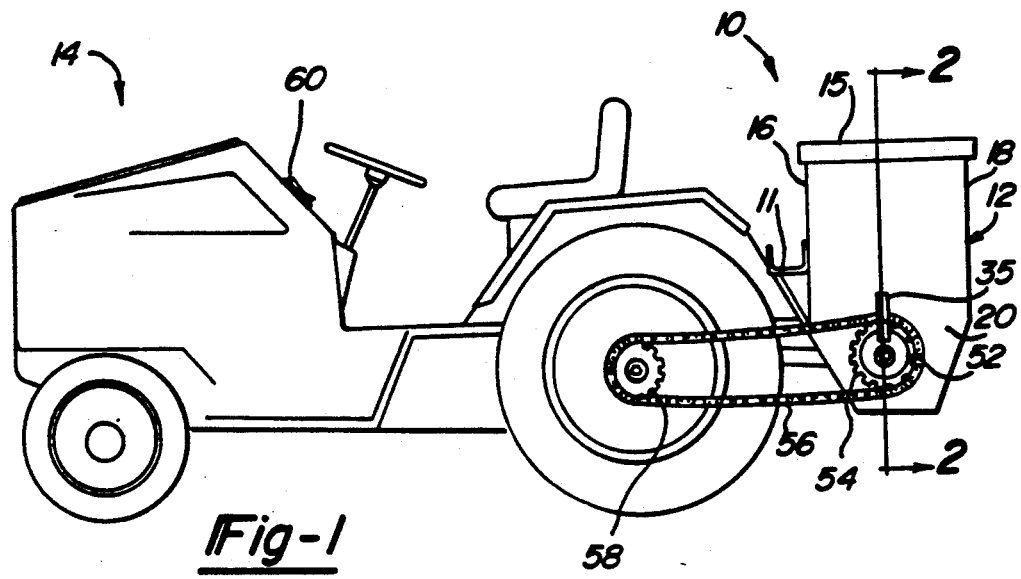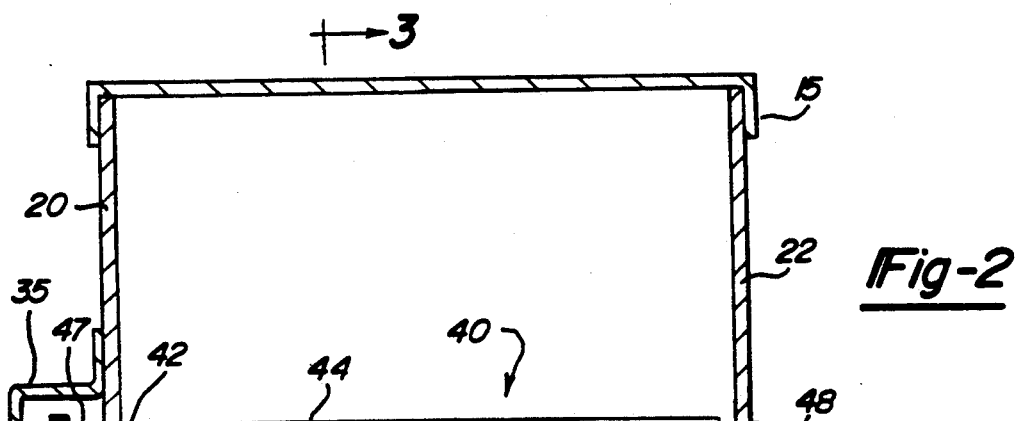

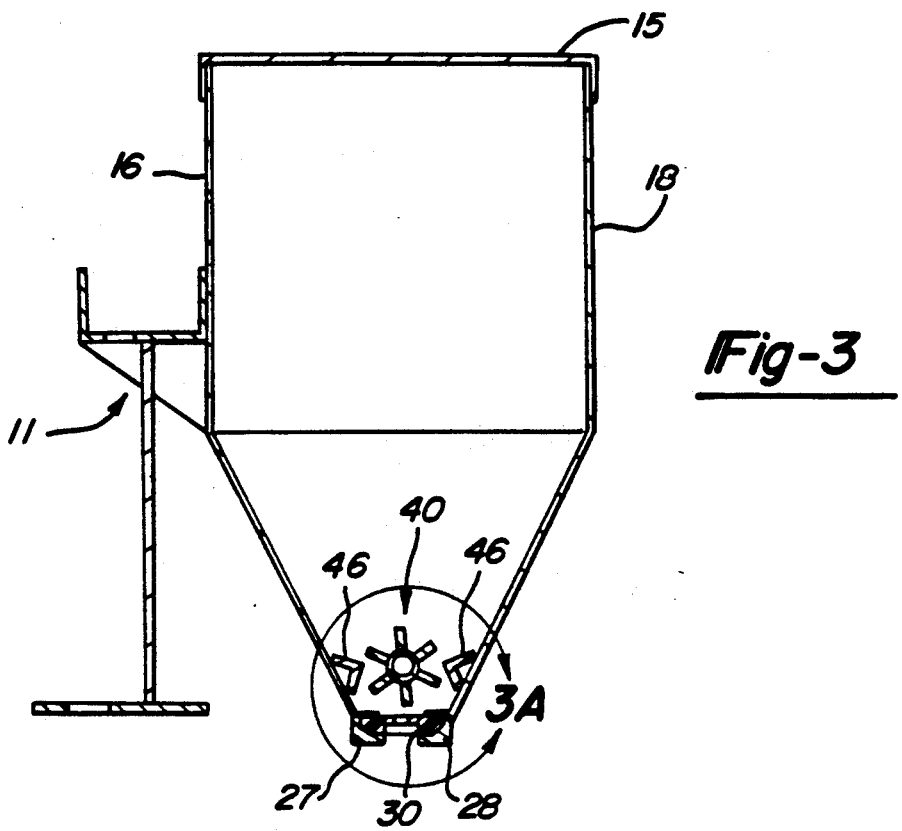
*Fig-3*
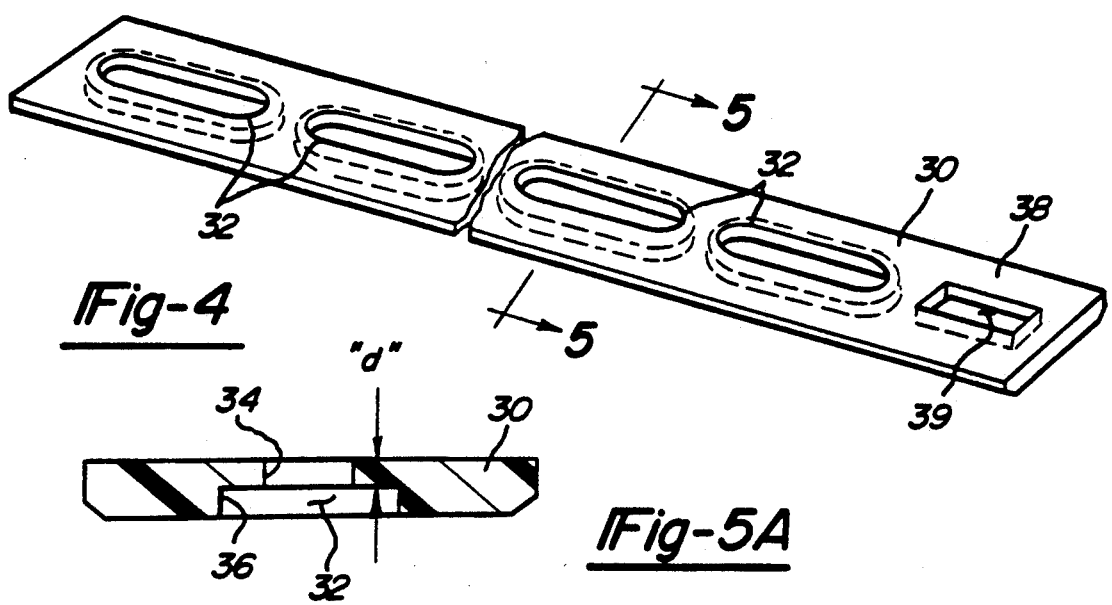
*Fig-4*
*Fig-5A*
*Fig-5B*

DROP SPREADER

BACKGROUND OF THE INVENTION

This invention relates generally to granular material spreaders and, more particularly, to a drop spreader apparatus equipped with interchangeable, pre-calibrated distribution gauges.

Granular material spreaders are used in a wide variety of applications, but are used most commonly for the distribution of fertilizers, insecticides, top soil or sand in top dressing applications, as well as for distribution of ice control materials on walkways around buildings and landscaping. Such spreaders may be generally classified in two types, drop spreaders and broadcast or spinner spreaders.

Drop spreaders are well known in the art with several types being described in U.S. Pat. No. 1,256,854, 2,627,364, 2,940,640, and 3,096,004. Typically, drop spreaders include a hopper having a plurality of discharge openings or apertures formed in the bottom through which the granular material is discharged under the action of gravity. In addition, many drop spreaders have a slide plate which can be adjusted for selectively obscuring the discharge openings in the hopper, thereby restricting or interrupting the amount of granular material discharged. Furthermore, some drop spreaders also incorporate an agitator or other device for mechanically disturbing the granular material located above the discharge openings, thereby improving the material flow of material through the openings.

In contrast to drop spreaders, broadcast or spinner type spreaders include a rotating member for centrifugally dispersing or "casting" the material out away from the spreader. The amount and concentration of material disbursed is controlled by metering the amount of material delivered to the rotating member and/or adjusting the speed of the rotating member. Unfortunately, conventional spreaders have not proven to be accurate in delivering a precise amount of granular material over a particular area. Therefore, such spreaders are not generally useful in applications where space is limited and accuracy is important, such as in the distribution of turf control products or ice control materials in close proximity to buildings and landscaping. More particularly, dispersion of ice control materials on lawns and landscaping results in not only a waste of material, but there are also ecological concerns since some ice control materials are harmful to lawns and shrubbery. Alternatively, the dispersion of turf control products onto walkways and driveways is undesirable in that it may eventually be washed into ground water supplies, lakes and streams.

While drop spreaders are more accurate than broadcast spreaders in delivering granular material over a particular area, proper adjustment of the slide plate arrangement associated therewith may prove to be problematic. For example, in dispensing ice control materials it is often desirable to use rock salt and calcium chloride. Rock salt is preferred on thick ice to improve traction and break the ice up so that it may subsequently be removed. Alternatively, calcium chloride is the preferred material when there is light icing since it melts the ice at lower temperatures. In a typical application, rock salt us initially applied to break up the thick ice, followed by application of calcium chloride to prevent the reformation of ice. Unfortunately, to switch between these differing materials with a traditional drop spreader requires significant adjustment to get the proper distribution. Such an arrangement is highly inefficient in that, prior to making the adjustment, either too much or not enough material is spread. Thus, material is either wasted or multiple applications are required.

Another drawback associated with both drop and broadcast spreaders is that the agitator or rotating member is generally connected to or integral with the axle onto which the wheels are mounted. In this arrangement, the tractive engagement between the wheels and the surface over which the material is to be applied causes rotation of the wheel and the axle, thus driving the agitator or rotating member as the spreader is moved about. As can be appreciated, this arrangement is rather ineffective when the surface over which the material is applied is ice covered, since traction is relatively poor.

SUMMARY OF THE INVENTION

The present invention is directed to a drop spreader which overcomes the numerous disadvantages associated with conventional spreaders for dispersing a precise amount of material over a controlled area.

As a related object, the present invention also provides an improved drop spreader apparatus which can be easily and quickly adjusted to disperse a wide variety of materials in a controlled manner.

Still a further object of the present invention is to provide an interchangeable means for controlling the dispersion of granular material from the drop spreader apparatus of the present invention.

Accordingly, the present invention provides an apparatus for spreading granular material having a hopper for holding a quantity of material to be spread, a rotatable auger supported within the hopper, drive means for driving the auger, and a material gauge for controlling the amount of material dispersed in response to actuation of the drive means. In addition, the material gauge is configured to prevent the flow of material when the drive means is maintained in a non-actuated state.

BRIEF DESCRIPTION OF THE DRAWINGS

These and other advantages, objects and features of the present invention will become apparent to those skilled in the art by referring the following written description and drawings in which:

FIG. 1 shows a drop spreader apparatus attached to a tractor in a exemplary embodiment of the present invention;

FIG. 2 is a sectional view of the drop spreader apparatus as viewed along line 2—2 of FIG. 1;

FIG. 3 is a sectional view of the drop spreader apparatus as viewed along line 3—3 of FIG. 2;

FIG. 3A is a partial sectional view for illustrating the operative relationship of the rotatable auger to a material gauge associated with the drop spreader apparatus;

FIG. 4 is a perspective view of a material gauge of the present invention;

FIG. 5A is a sectional view of the material gauge illustrating an exemplary configuration for the discharge apertures formed therein; and FIG. 5B is a sectional view of the material gauge illustrating a second exemplary configuration of the discharge apertures formed therein.

DETAILED DESCRIPTION OF THE INVENTION

In general, the present invention is directed to an improved drop spreader apparatus which functions to accurately distribute granular material over a defined area. With particular reference to FIG. 1 a drop spreader apparatus 10 of the present invention is shown suitably connected by a bracket 11 to the rear of exemplary tractor 14. As best seen in FIGS. 2 and 3, drop spreader apparatus 10 includes a hopper 12 formed by forward and rearward walls 14 and 16, respectively, and left and right side walls 20 and 22, respectively. The top portions of walls 14, 16, 20 and 22 form a substantially rectangular section with the lower portions of walls 14, 16, 20 and 22 forming a tapered section terminating in an elongated rectangular section near the bottom of the hopper 12. A removable lid 15 is provided for enclosing the top portion of hopper 12, thus allowing for the transportation and storage of drop spreader apparatus 10 without exposing the granular material contained within hopper 12 to inclement weather conditions.

With particular reference to FIGS. 3 and 3A, the lower most portion of walls 14 and 16 have an angled flanged portion 24 and 26, respectively. The terminal edges of flanges 24 and 26 and side walls 20 and 22 form an elongated rectangular aperture 25 at the bottom of hopper 12. Elongated "L" shaped guide members 27 and 28 are suitably fixed (i.e. welded) to the base of hopper 12 below aperture 25 to form an elongated and generally rectangular channel 29 into which a pre-calibrated material gauge 30 is slidably received. As seen in FIG. 2, side wall 20 extends below the base of hopper 12 for enclosing rectangular channel 29 so as to define a stop surface. Thus, material gauge 30 may only be slidably inserted into channel 29 from the right side and is prevented from sliding beyond the left side of hopper 12 upon abutting engagement with side wall 22. Once material gauge 30 is inserted into channel 29, a granular material having a known grain size may be placed into hopper 12. Due to the weight of the granular material, a downward force will be exerted on material gauge 30 thereby retaining it in place during operation of the apparatus.

Drop spreader 10 is also shown to include an auger 40 disposed in the lower portion of hopper 12. Auger 40 includes a shaft 42 having its ends supported in suitable bearing assemblies 48 and having a plurality of elongated blade-like projections 44 extending radially outwardly from shaft 42. The left end 47 of auger shaft 42 is shown to extend beyond its respective bearing assembly 48 for accommodating a clutch assembly 50 thereon. More particularly, end 47 of auger shaft 42 is fixed (i.e., keyed) to an electric clutch mechanism 52 for driving engagement therewith. A sprocket 54 is journally supported on auger shaft 42 and is driven by chain 56. Chain 56 is further engaged with a second sprocket 58 that is rotatably driven by the wheel hub of tractor 14. Thus, rotary movement of the wheels of tractor 14 causes second sprocket 58 to drive sprocket 54. When clutch assembly 50 is activated upon the tractor operator manipulating a switch 60, the rotary motion of sprocket 54 is coupled by electric clutch mechanism 52 to auger shaft 42 for causing driven rotation of auger 40. As will be discussed, rotation of auger 40 operates to distribute the granular material in hopper 12 through a series of discharge openings 32 formed in material gauge 30. Conversely, when clutch assembly 50 is deactivated, sprocket 54 is uncoupled from electric clutch mechanism 52 such that rotation of sprocket 54 does not result in rotation of auger 40. With auger 40 maintained in a non-rotational state, the granular material is inhibited from passing through discharge openings 32.

With particular reference to the enlarged illustration shown in FIG. 3A, auger 40 is shown disposed in close proximity to material gauge 30. When blade-like projections 44 rotate past elongated discharge openings 32 formed in material gauge 30, projections 44 act to forcibly urge a fine layer of granular material 64 through discharge openings 32. Discharge openings 32 are sized to inhibit the flow of granular material 64 through material gauge 30 under the normal action of gravity, while permitting granular material 64 to be pressed therethrough under the rotative action of auger 40. Thus, in accordance with the teachings of the present invention, rotation of auger 40 causes the distribution of material from hopper 12 through the action of projections 44 forcibly pressing granular material 64 through discharge apertures 32 in material gauge 30. As will be further appreciated, when auger 40 is in a non-rotative state, (i.e. either because tractor 14 is not moving or because clutch assembly 50 is deactivated) material 64 will not be forcibly pressed through material gauge 30 such that distribution of material through discharge apertures 32 is stopped. Drop spreader 10 is also shown to include a pair of wipers 46 which act to prevent large lumps of material and/or excessive amounts of material from becoming trapped below auger 40. Moreover, wipers 46 further cause, under the rotary action of auger 40, large lumps of material to be broken up into an easily distributed size.

Auger 40 is shown in the preferred configuration having six flutes. While it should be understood that more or less flutes may be used with the present invention, six fluted auger 40 provides for an even rate of distribution of material at various tractor speeds. Moreover, sprockets 54 and 58 may also be sized in various ratios depending on the number of flutes on auger 40 to further control the rate of distribution of material 64 through discharge apertures 32.

In accordance with the teachings of the present invention, several differing embodiments of material gauge 30 may be constructed for calibrated distribution of various granular materials. Drop spreader 10 of the present invention can be easily converted from one material to another by simply sliding a material gauge 30 out of elongated channel 29, allowing the excess material remaining in hopper 12 to fall out, and then sliding a different material gauge 30 into elongated channel 29. By placing a tray under hopper 12 during this operation, the excess material may be easily collected and saved for reuse, thereby reducing waste. Further, drop spreader 10 is easily cleaned by removing material gauge 30 and simply washing or blowing out the inside of hopper 12.

With particular reference to FIG. 4, an exemplary pre-calibrated material gauge 30 for use with drop spreader 10 of the present invention is shown. In the preferred embodiment, material gauge 30 is an elongated rectangular piece of non-corrosive, semi-rigid, abrasion resistant material having a plurality of discharge apertures 32 formed therein. One preferred material would be ultra high molecular weight (UHMW) polyethylene. As is further shown, material gauge 30 has an aperture 39 formed at one end 38 for providing a handle member which assists the tractor operator during the insertion and extraction of material gauge 30 from rectangular channel 29 of hopper 12.

As best seen in FIGS. 5A and 5B, various alternative cross-sectional configurations for discharge apertures 32 of material gauge 30 can be utilized. When the granular material has an average size that is greater than the thickness of material gauge 30, the aperture configuration of FIG. 5B is preferably employed with discharge apertures 32 that are slightly smaller in size than the average size of the granules of material. When the granules of material have an average size that is less than the thickness of material gauge 30, then the configuration shown in FIG. 5A is preferred. As seen in FIG. 5A, discharge apertures 32 are stepped to include an upper narrowed portion 34 and a lower widened or relief portion 36. Narrowed portion 34 of discharge apertures 32 is sized to be slightly smaller than the average granule size of the material to pass therethrough for allowing for distribution of material according to the principles of the present invention. Relief portion 36 of discharge apertures 32 has an increased width for allowing material that is pressed through narrowed portion 34 to fall freely through the remaining thickness of material gauge 30 in an unobstructed manner. Preferably, the width of relief portion 36 of discharge apertures 32 is approximately about 70 to 100 percent of the thickness of material gauge 30. Finally, a thickness "d" is shown for defining the depth of narrowed portion 34 of discharge apertures 32. Preferably, the thickness "d" is sized slightly smaller than the average granule size of the material to be spread, thereby preventing material from becoming trapped within material gauge 30.

According to another feature of the teachings of the present invention, distinct material gauges 30 can be constructed that are calibrated for use with a particular granular material. Such material gauges would have discharge apertures formed therein which are pre-calibrated to distribute a desired amount of a particular granular material while inhibiting discharge therethrough during non-rotation of auger 40. As discussed, when drop spreader 10 is to be converted from spreading one material to another, one material gauge is simply removed and a different pre-calibrated material gauge is inserted. To further facilitate conversion of drop spreader 10 for distributing a variety of materials, material gauge 30 further has chamfered surfaces 33. As best seen in FIG. 3A, chamfered surfaces 33 engage complementary formations 29 of guide members 27 and 28, respectively, thereby assuring that material gauge 30 is always inserted into elongated channel 29 in the proper orientation.

While the above description discusses a preferred embodiment of the present invention, it will be understood that the description is exemplary in nature and is not intended to limit the scope of the invention. The present invention will therefore be understood as susceptible to modification, alteration, and variation by those skilled in the art without deviating from the fair scope of the invention as defined in the following claims.

What is claimed is:

1. An apparatus for spreading granular material comprising:
   a hopper within which the granular material is stored, said hopper having a elongated opening;
   auger means supported for rotation within said hopper in close proximity to said elongated opening;
   a gauge member removably supported adjacent said elongated opening of said hopper and having metering means for metering the quantity of the granular material to be discharged from said hopper;
   drive means including a source of driving torque for causing rotation of said auger means, said drive means having a first operating mode for rotatably driving said auger means to forcibly urge the granular material through said metering means, and a second operating mode for inhibiting rotation of said auger means such that said metering means inhibits discharge of the granular material therethrough; and
   actuation means for selectively shifting said drive means between said first and second operating modes.

2. The apparatus of claim 1 wherein said gauge member is a plate adapted to enclose said elongated opening, and said metering means defining a plurality of discharge apertures formed in said plate that are sized to inhibit the free flow of the granular material therethrough when said drive means is in said second operating mode, said discharge apertures being sized to permit flow of the granular material therethrough in response to rotation of said auger means when said drive means is in said first operating mode.

3. The apparatus of claim 2 wherein said discharge apertures formed in said plate each include a narrowed portion sized to restrict the free flow of material therethrough and a widened portion aligned below said narrowed portion for allowing the granular material pressed through said narrowed portion in response to rotation of said auger means to be discharged from said hopper.

4. The apparatus of claim 3 wherein said plate is fabricated from a polyethylene material.

5. The apparatus of claim 1 wherein said drive means comprises:
   a prime mover for causing rotary motion;
   a first sprocket coupled for rotation to said prime mover;
   a second sprocket;
   chain means interconnecting said first and second sprockets for rotatably driving said second sprocket in response to rotation of said first sprocket; and
   clutch means for selectively coupling said auger means to said second sprocket.

6. The apparatus of claim 5 wherein said actuation means is operable for actuating said clutch means for rotatably driving said auger means, whereby the granular material is forcibly urged through said metering means and discharged from said hopper.

7. An apparatus mountable to a prime mover for spreading granular material comprising:
   a hopper having an elongated aperture;
   mounting means forming an elongated and generally rectangular channel below said aperture;
   gauge means slidably received in said rectangular channel and having metering means for metering the amount of granular material to be discharged from said hopper;
   auger means supported for rotation within said hopper in close proximity to said elongated aperture, rotation of said auger means being operable for forcibly urging the granular material through said metering means;

a first sprocket coupled for rotation to the prime mover;

a second sprocket;

chain means for transferring rotary motion from said first sprocket to said second sprocket; and clutch means for selectively transferring rotary motion from said second sprocket to said auger means for causing the granular material to be forcibly discharged from said hopper.

8. The apparatus of claim 7 wherein said gauge means is a plate, and said metering means includes a plurality of discharge apertures formed in said plate, said discharge apertures being sized to allow granular material to be forcibly pressed through said discharge apertures in response to rotation of said auger means, said discharge aperture being further adapted to inhibit discharge of granular material therethrough in response to non-rotation of said auger means.

9. The apparatus of claim 8 wherein said discharge apertures formed in said plate have a stepped configuration defining a first opening sized to normally restrict the free flow of granular material therethrough and a second opening aligned below said first opening, said second opening being larger than said first opening for allowing material forcibly pressed through said first opening to be freely discharged from said hopper.

10. The apparatus of claim 8 wherein said plate is fabricated from a polyethylene material.

11. The apparatus of claim 8 wherein said discharge apertures formed in said plate are pre-calibrated to controllably meter the quantity of a particular size of granular material to be discharged from said hopper.

12. The apparatus of claim 11 wherein said plate further comprises handle means for permitting insertion and removal of said plate from said channel.

* * * * *